(12) United States Patent
Takahashi et al.

(10) Patent No.: US 11,563,350 B2
(45) Date of Patent: Jan. 24, 2023

(54) ROTATING ELECTRIC MACHINE WIRING MEMBER

(71) Applicant: Hitachi Metals, Ltd., Tokyo (JP)

(72) Inventors: Noriyuki Takahashi, Tokyo (JP); Jun Umetsu, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 194 days.

(21) Appl. No.: 17/011,699

(22) Filed: Sep. 3, 2020

(65) Prior Publication Data

US 2021/0091623 A1    Mar. 25, 2021

(30) Foreign Application Priority Data

Sep. 24, 2019  (JP) .............................. JP2019-172794

(51) Int. Cl.
| | |
|---|---|
| H02K 3/50 | (2006.01) |
| H02K 3/24 | (2006.01) |
| H02K 21/14 | (2006.01) |
| H02K 9/19 | (2006.01) |
| H02K 3/38 | (2006.01) |

(52) U.S. Cl.
CPC ................. *H02K 3/50* (2013.01); *H02K 3/24* (2013.01); *H02K 3/38* (2013.01); *H02K 9/19* (2013.01); *H02K 21/14* (2013.01)

(58) Field of Classification Search
CPC ....... H02K 9/19; H02K 15/0056–0068; H02K 2203/06; H02K 2203/09
USPC ............................... 310/54, 71, 216.005, 416
See application file for complete search history.

(56) References Cited

U.S. PATENT DOCUMENTS

| | | |
|---|---|---|
| 9,825,509 B2 | 11/2017 | Nagumo |
| 10,396,620 B2 | 8/2019 | Egami et al. |
| 2015/0061426 A1 | 3/2015 | Nagumo |

(Continued)

FOREIGN PATENT DOCUMENTS

| | | | |
|---|---|---|---|
| EP | 2562915 B1 * | 5/2015 | ............. H02K 3/522 |
| JP | 2016-032316 A | 3/2016 | |
| JP | 2017-079528 A | 4/2017 | |

(Continued)

OTHER PUBLICATIONS

Office Action issued in the corresponding Japanese Patent Application No. 2019-172794 dated Nov. 1, 2022.

*Primary Examiner* — Quyen P Leung
*Assistant Examiner* — Minki Chang
(74) *Attorney, Agent, or Firm* — Thomas W. Cole; Calderon Safran & Cole P.C.

(57) ABSTRACT

A rotating electric machine wiring member is configured to connect coil ends of a stator and associated electrodes of a terminal block in a rotating electric machine. The rotating electric machine wiring member includes a plurality of electrical conducting wires, and a holding portion configured to hold the plurality of electrical conducting wires together. The holding portion includes a holder, which is provided to cover all respective peripheries of the plurality of electrical conducting wires in respective one parts in a longitudinal direction of the plurality of electrical conducting wires together, and a molded resin section made of a molded resin to cover one part of the holder. Exposed parts of the holder uncovered with the molded resin section are arranged to surround a peripheral edge of the molded resin section.

5 Claims, 8 Drawing Sheets

(56) References Cited

U.S. PATENT DOCUMENTS

2017/0110929 A1    4/2017  Egami et al.
2021/0367494 A1* 11/2021  Takahashi ............ H02K 15/022

FOREIGN PATENT DOCUMENTS

| JP | 2018-164387 A | | 10/2018 | | |
|---|---|---|---|---|---|
| JP | 2021097428 A | * | 6/2021 | ............. | H02K 11/25 |
| WO | 2013/146433 A1 | | 10/2013 | | |

* cited by examiner

ROTATING ELECTRIC MACHINE WIRING MEMBER

CROSS-REFERENCE TO RELATED APPLICATION

The present application is based on Japanese Patent Application No. 2019-172794 filed on Sep. 24, 2019, the entire contents of which are incorporated herein by reference.

BACKGROUND OF THE INVENTION

1. Field of the Invention

The present invention relates to a wiring member for rotating electric machine.

2. Description of the Related Art

There has been known a rotating electric machine wiring member that is configured to connect coil ends of a stator and associated electrodes of a terminal block in a rotating electric machine. As such a rotating electric machine wiring member, there is known a wiring member including a plurality of electrical conducting wires, and a molded resin section, which is formed by molding a molding resin to cover the plurality of electrical conducting wires. See, e.g., JP2018-164387A.

[Patent Document 1] JP2018-164387A

In the rotating electric machine wiring member configured to include the molded resin section, when the molded resin section is formed, the plurality of electrical conducting wires are clamped with a mold for forming the molded resin section. At this point of time, the mold used to form the molded resin section may interfere with the plurality of electrical conducting wires, and cause damage to electrical insulating members of the plurality of electrical conducting wires, leading to a failure in electrical insulation.

In addition, when the molded resin section is formed in the rotating electric machine wiring member, the molding resin may leak out from a gap between the mold used to form the molded resin section and the plurality of electrical conducting wires, leading to a thin resin film formation called as a burr formation. Since this burr formation may cause the resulting burr to be chipped off by vibration or the like and get into the rotating electric machine as a foreign object, when the molded resin section is formed in the rotating electric machine wiring member, suppressing the molding resin leaking out from the gap between the mold used to form the molded resin section and the plurality of electrical conducting wires so that substantially no burr formation can occur is desired.

SUMMARY OF THE INVENTION

In light of the foregoing, it is an object of the present invention to provide a rotating electric machine wiring member, which is able to suppress the occurrence of an electrical insulation failure resulting from the mold used to form the molded resin section interfering with the plurality of electrical conducting wires, and to suppress the occurrence of a burr formation resulting from the leakage of the molding resin.

For the purpose of solving the above-described problems, the present invention provides a rotating electric machine wiring member, which is configured to connect coil ends of a stator and associated electrodes of a terminal block in a rotating electric machine, comprising: a plurality of electrical conducting wires; and a holding portion configured to hold the plurality of electrical conducting wires together, the holding portion including a holder, which is provided to cover all respective peripheries of the plurality of electrical conducting wires in respective one parts in a longitudinal direction of the plurality of electrical conducting wires together, and a molded resin section comprising a molded resin to cover one part of the holder, wherein exposed parts of the holder uncovered with the molded resin section are arranged to surround a peripheral edge of the molded resin section.

POINTS OF THE INVENTION

According to the present invention, it is possible to provide a rotating electric machine wiring member, which is able to suppress the occurrence of an electrical insulation failure resulting from the mold used to form the molded resin section interfering with the plurality of electrical conducting wires, and to suppress the occurrence of a burr formation resulting from the leakage of the molding resin.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Embodiment

An embodiment of the present invention will be described below in conjunction with the accompanying drawings.

Figure 1A:
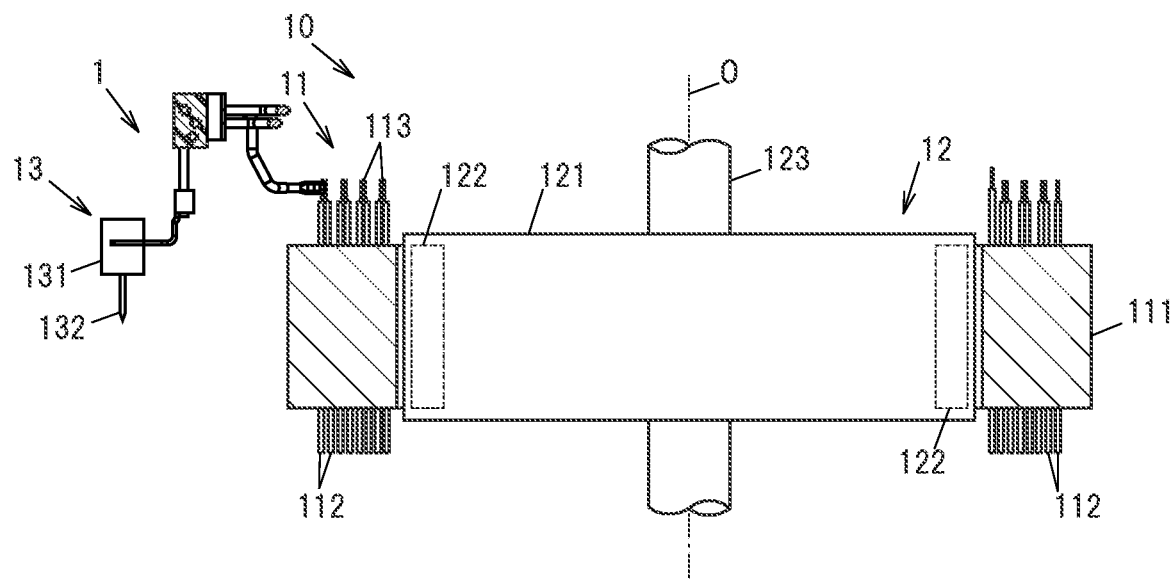
FIG. 1A is an overall view showing an example of a configuration of a rotating electric machine, which includes a rotating electric machine wiring member according to one embodiment of the present invention.
Figure 1B:
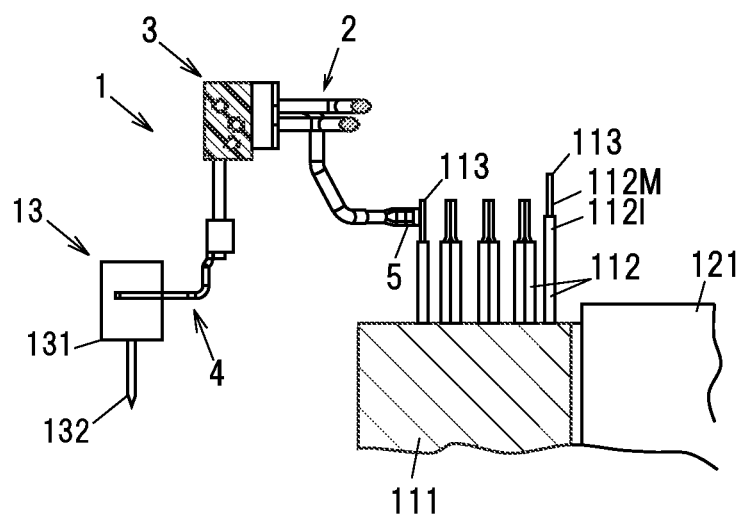
FIG. 1B is a partially enlarged view of the rotating electric machine including the rotating electric machine wiring member shown in FIG. 1A.

FIG. 1A is an overall view showing a configuration example of a rotating electric machine 10, which includes a rotating electric machine wiring member 1 according to one embodiment of the present invention, and FIG. 1B is a partially enlarged view of the rotating electric machine 10 including the rotating electric machine wiring member 1 shown in FIG. 1A. The rotating electric machine 10 is configured to be mounted on a vehicle, which is driven by an electric power, such as an electric automobile or a so-called hybrid vehicle or the like. In the following description, a case in which the rotating electric machine 10 is used as an electric motor will be described, but the rotating electric machine 10 can also be used as an electric generator.

The rotating electric machine 10 is configured to include a rotor (rotating part) 12, a stator (stationary part) 11, which is arranged to surround the rotor 12, and a terminal block 13. The rotor 12 is configured with a plurality of magnets 122 being embedded in a rotor core 121, which is made of a soft magnetic metal, so that the rotor 12 is to be rotated together with a shaft 123 inserted in and passed through a central portion thereof. The stator 11 is configured to include a stator core 111, which is made of a soft magnetic metal, and a plurality of coil pieces 112.

In the following description, a direction parallel to a rotation axis line O of the shaft 123 will be referred to as the axial direction, while a direction across the rotation axis line O of the shaft 123 and perpendicular to the rotation axis line O of the shaft 123 will be referred to as the radial direction, and a direction perpendicular to the axial direction and the radial direction will be referred to as the circumferential direction. Further, in the following description, for convenience of description, in the rotating electric machine 10, of two opposite sides in the axial direction of the stator core 111 of the stator 11, one side in which the rotating electric machine wiring member 1 is arranged will be referred to as the upper side, while the opposite side thereto will be referred to as the lower side. It should be noted, however, that the upper side and the lower side are not to be construed as specifying the upper and lower sides in a vertical direction with the rotating electric machine 10 mounted on the vehicle.

Although being not shown, the stator core 111 of the stator 11 is configured to integrally include a circular cylindrical shape back yoke, and a multiplicity of teeth, which are protruding inward in the radial directions from the back yoke. The stator core 111 of the stator 11 is formed with slots between adjacent ones, respectively, of the multiplicity of teeth in the circumferential direction thereof. In the stator 11, its coil pieces 112 are each being received and held in those slots, respectively, of its stator core 111.

Further, the coil pieces 112 of the stator 11 are each being configured to be composed of a respective electrically conductive metal 112M, which has a good electrical conductivity, such as a copper or an aluminum or the like, and a respective electrically insulative coating layer 1121, which is provided over a surface of the respective electrically conductive metal 112M. In the present embodiment, for the stator 11, the electrically conductive metals 112M of the coil pieces 112 are each being configured with a rectangular solid wire which is rectangular in cross section shape, and the electrically insulative coating layers 1121 of the coil pieces 112 are each made of an enamel coating. For respective coil ends 113 of the coil pieces 112, which are end portions of those coil pieces 112, their respective electrically conductive metals 112M are exposed by removing their respective coating layers 1121. For the stator 11, two sets of three phase (U phase, V phase, and W phase) stator windings, which are out of phase in electrical angle by a predetermined angle, are constituted by welding the respective coil ends 113 of the coil pieces 112 together.

Further, the rotating electric machine 10 includes a housing (not shown) that houses the stator 11 therein, and a terminal block 13 that is fixed to the housing. The terminal block 13 includes a base block 131, which is made of a resin and fixed to the aforementioned housing, and three electrodes 132, which are to be fed with three phase alternating electric currents, respectively, from a controller.

Further, the rotating electric machine 10 is configured to include the rotating electric machine wiring member 1 according to the present embodiment. The rotating electric machine wiring member 1 is the wiring member configured to connect the coil ends 113 of the stator 11 and the associated electrodes 132 of the terminal block 13 in the rotating electric machine 10. The rotating electric machine wiring member 1 will be described in detail below.

(Rotating Electric Machine Wiring Member 1)

Figure 2A:
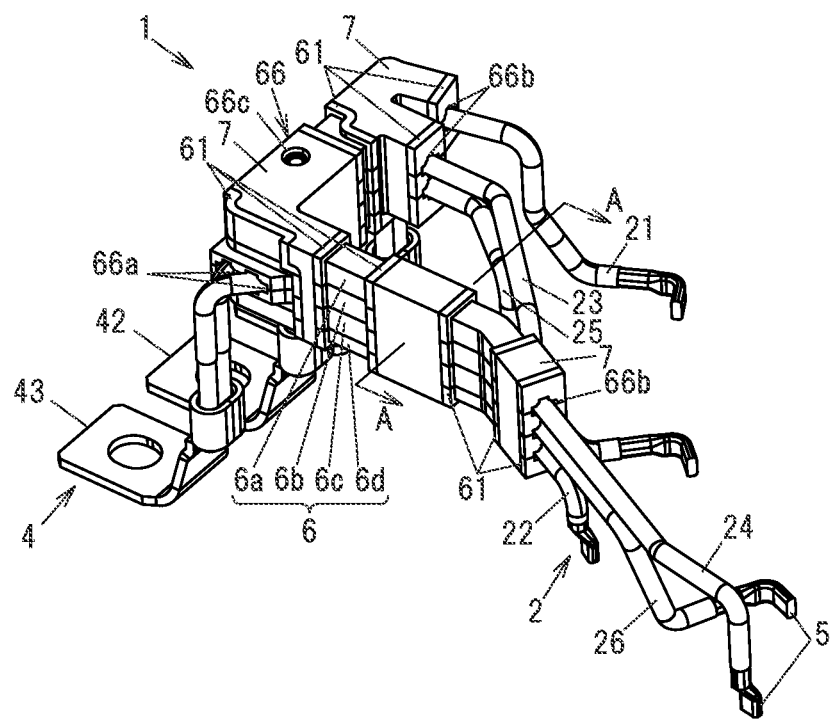
FIG. 2A is a perspective view showing the rotating electric machine wiring member.
Figure 2B:
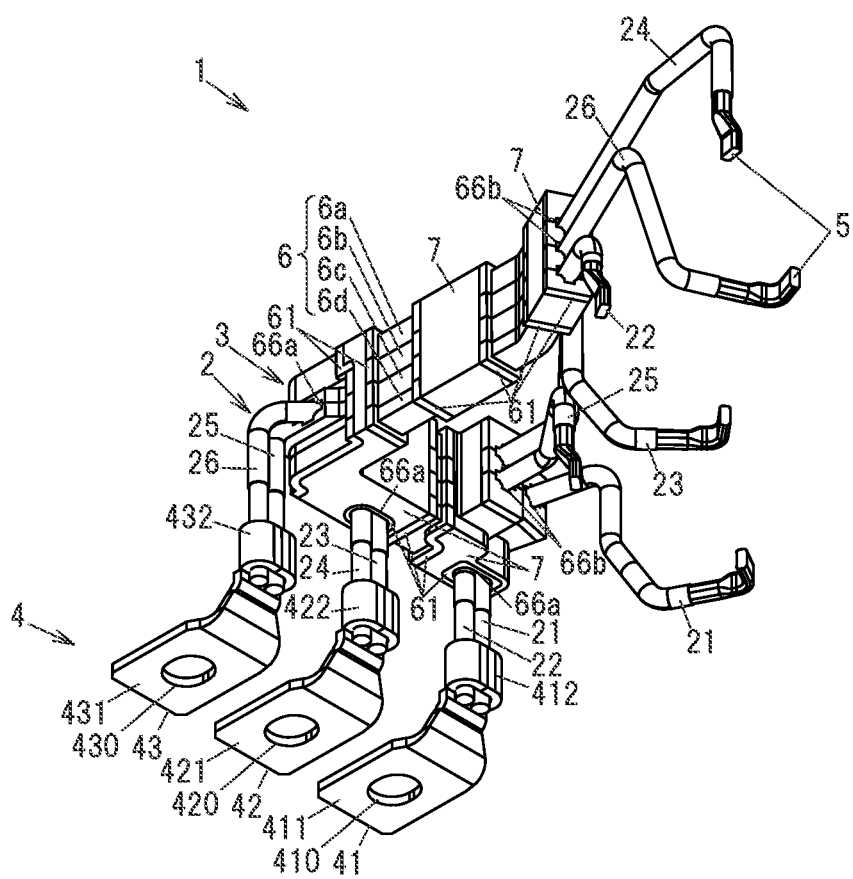
FIG. 2B is a perspective view showing the same rotating electric machine wiring member.

FIGS. 2A and 2B are perspective views showing the rotating electric machine wiring member 1 according to the present embodiment. The rotating electric machine wiring member 1 according to the present embodiment includes a plurality of electrical conducting wires 2, which are configured to connect the coil ends 113 of the stator 11 and the associated electrodes 132 of the terminal block 13 in the rotating electric machine 10, and a holding portion 3, which is configured to hold the plurality of electrical conducting wires 2.

In the present embodiment, the rotating electrical machine wiring member 1 is configured to be provided with six of the electrical conducting wires 2 and three terminals 4, and connect together the three electrodes 132 of the terminal block 13 and the coil ends 113 of the U, the V, and the W phase coil pieces 112, respectively, of the stator 11. Note that a so-called bus ring whose electrical conducting wires are formed in a ring shape has been known as a wiring member for a rotating electric machine, but that the rotating electrical machine wiring member 1 according to the present embodiment is different from the aforementioned bus ring, and is a non-ring shape wiring member whose electrical conducting wires 2 are not formed in a ring shape. Further, the six electrical conducting wires 2 of the rotating electrical machine wiring member 1 are high in rigidity to the extent of being able to retain their own shapes. Further, the six electrical conducting wires 2 of the rotating electrical machine wiring member 1 are formed in such a manner that their cross sections perpendicular to their longitudinal directions are circular in shape.

The six electrical conducting wires 2 of the rotating electrical machine wiring member 1 are made of a first and a second U phase lead wire 21 and 22, a first and a second V phase lead wire 23 and 24, and a first and a second W phase lead wire 25 and 26. Each electrical conducting wire 2 is configured to include a respective electrical conducting body 2M, which is made of an electrically conductive metal, and a respective electrically insulative coating layer 2I, which is provided over a surface of the respective electrical conducting body 2M. As the electrically conductive metal for the electrical conducting bodies 2M of the six electrical conducting wires 2, for example, a copper or a copper alloy can suitably be used. As the coating layers 2I of the six electrical conducting wires 2, an enamel coating film can suitably be used. The electrical conducting bodies 2M of the six electrical conducting wires 2 are each being configured as a solid wire (a single metal conductor that is not a stranded wire), and in the present embodiment, are each being configured by press molding a round solid wire, which is circular in cross section shape, into a predetermined shape. It should be noted, however, that the electrical conducting bodies 2M of the six electrical conducting wires 2 may each be formed by using a rectangular solid wire, which is rectangular in cross section shape.

The three terminals 4 of the rotating electrical machine wiring member 1 are made of a U phase terminal 41, a V phase terminal 42, and a W phase terminal 43. The U phase terminal 41 is configured to include a plate shape portion 411, which is connected to the U phase electrode of the terminal block 13, and a staking portion 412, in which respective one end portions of the first and the second U phase lead wires 21 and 22 are both being staked. The plate shape portion 411 of the U phase terminal 41 is formed with a bolt insertion passage 410 therein, so that the plate shape portion 411 of the U phase terminal 41 is connected to the U phase electrode of the terminal block 13 by a bolt (not shown) being inserted in and passed through the bolt insertion passage 410. Similarly, the V phase terminal 42 is configured to include a plate shape portion 421, which is connected to the V phase electrode of the terminal block 13, and a staking portion 422, in which respective one end portions of the first and the second V phase lead wires 23 and 24 are both being staked. The plate shape portion 421 of the V phase terminal 42 is formed with a bolt insertion passage 420 therein, so that the plate shape portion 421 of the V phase terminal 42 is connected to the V phase electrode of the terminal block 13 by a bolt (not shown) being inserted in and passed through the bolt insertion passage 420. Further, similarly, the W phase terminal 43 is configured to include a plate shape portion 431, which is connected to the W phase electrode of the terminal block 13, and a staking portion 432, in which respective one end portions of the first and the second W phase lead wires 25 and 26 are both being staked. The plate shape portion 431 of the W phase terminal 43 is formed with a bolt insertion passage 430 therein, so that the plate shape portion 431 of the W phase terminal 43 is connected to the W phase electrode of the terminal block 13 by a bolt (not shown) being inserted in and passed through the bolt insertion passage 430.

The respective other end portion of each electrical conducting wire 2 (the respective opposite end portion of each electrical conducting wire 2 to the terminal 4) is provided with a respective joining portion 5 in which the respective electrical conducting body 2M of each electrical conducting wire 2 is exposed by removing the respective coating layer 2I of each electrical conducting wire 2 over a respective range of a predetermined length. The respective joining portions 5 of the six electrical conducting wires 2 are welded to the corresponding coil ends 113 of the coil pieces 112 of the stator 11 by TIG (Tungsten Inert Gas) welding, which is a type of welding method by arc discharge using an inert gas. Note that the opposite surfaces of the respective joining portions 5 of the six electrical conducting wires 2 to the coil ends 113 of the coil pieces 112 of the stator 11 are rendered planar by press working.

Figure 3:
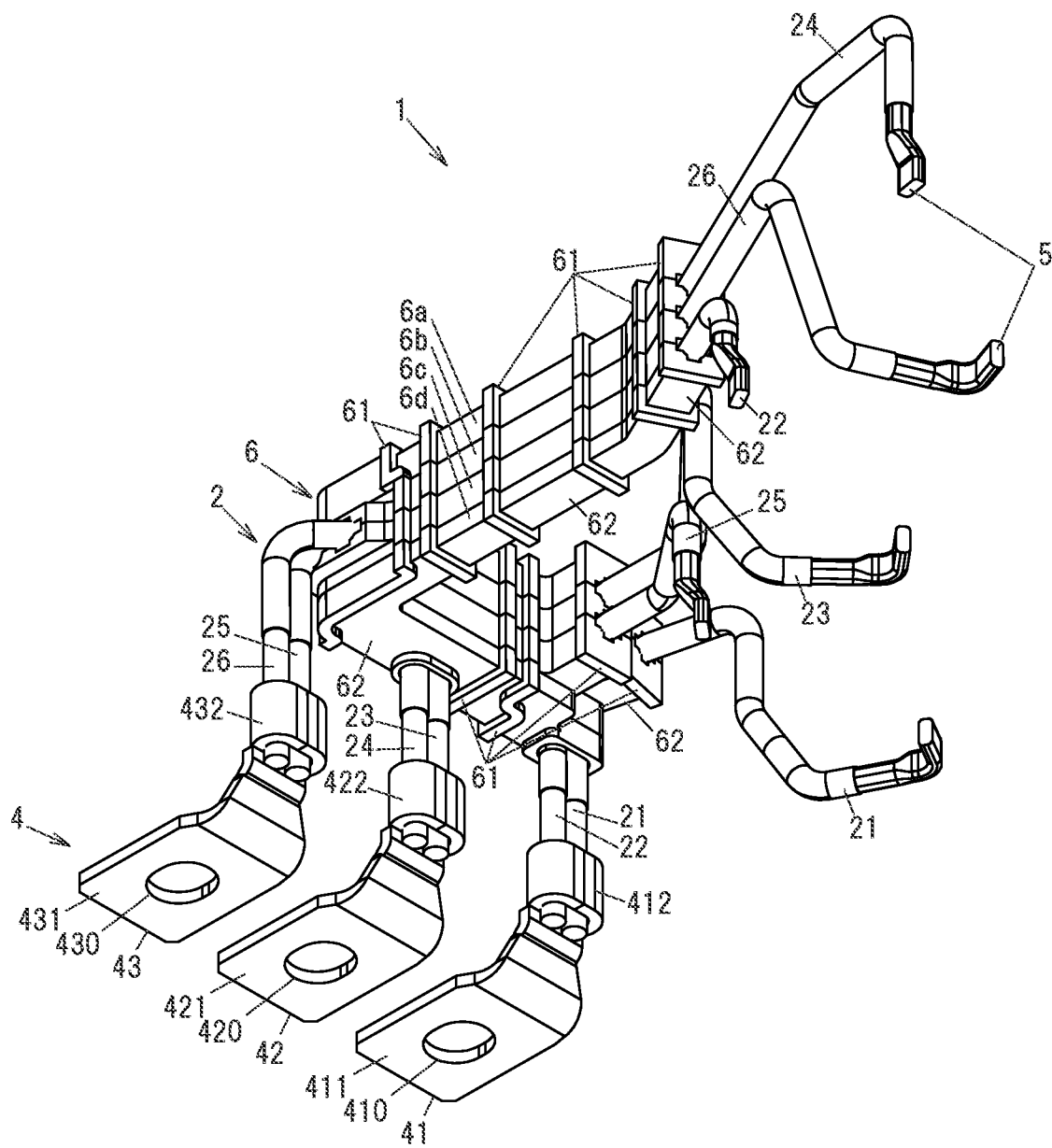
FIG. 3 is a perspective view showing the same rotating electric machine wiring member whose molded resin sections are omitted therefrom.
Figure 4:
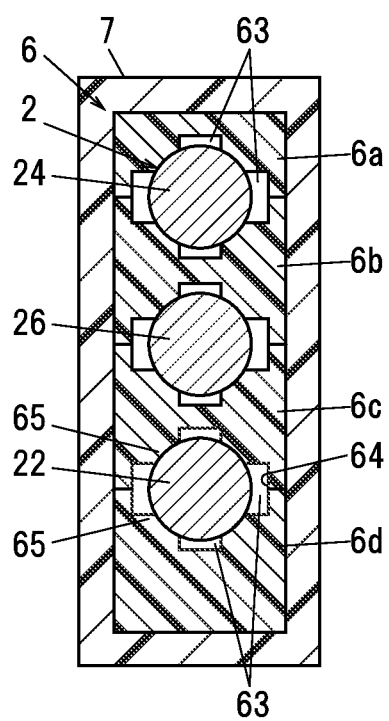
FIG. 4 is a cross sectional view taken along a line A-A shown in FIG. 2A.
Figure 5:
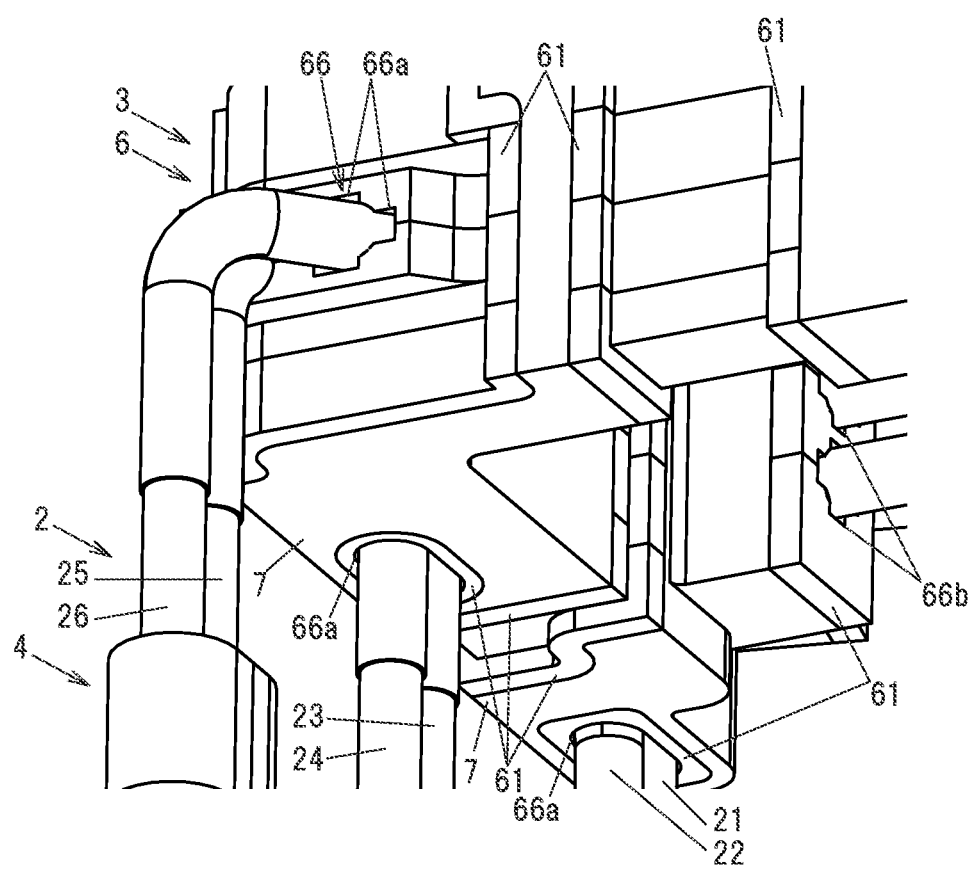
FIG. 5 is an enlarged perspective view of a part of the same rotating electric machine wiring member.
Figure 6:
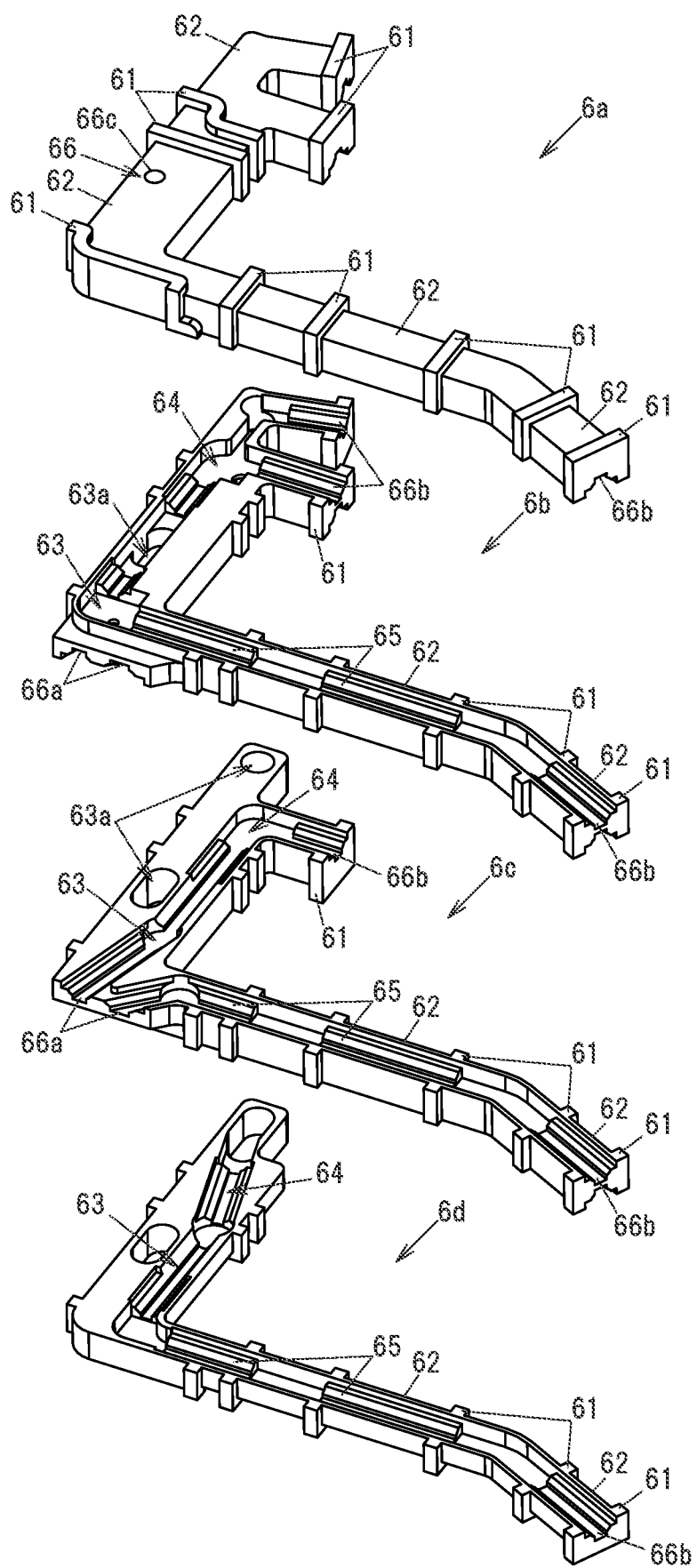
FIG. 6 is an exploded perspective view showing divided holders to together constitute a holder for constituting a holding portion of the same rotating electric machine wiring member.
Figure 7:
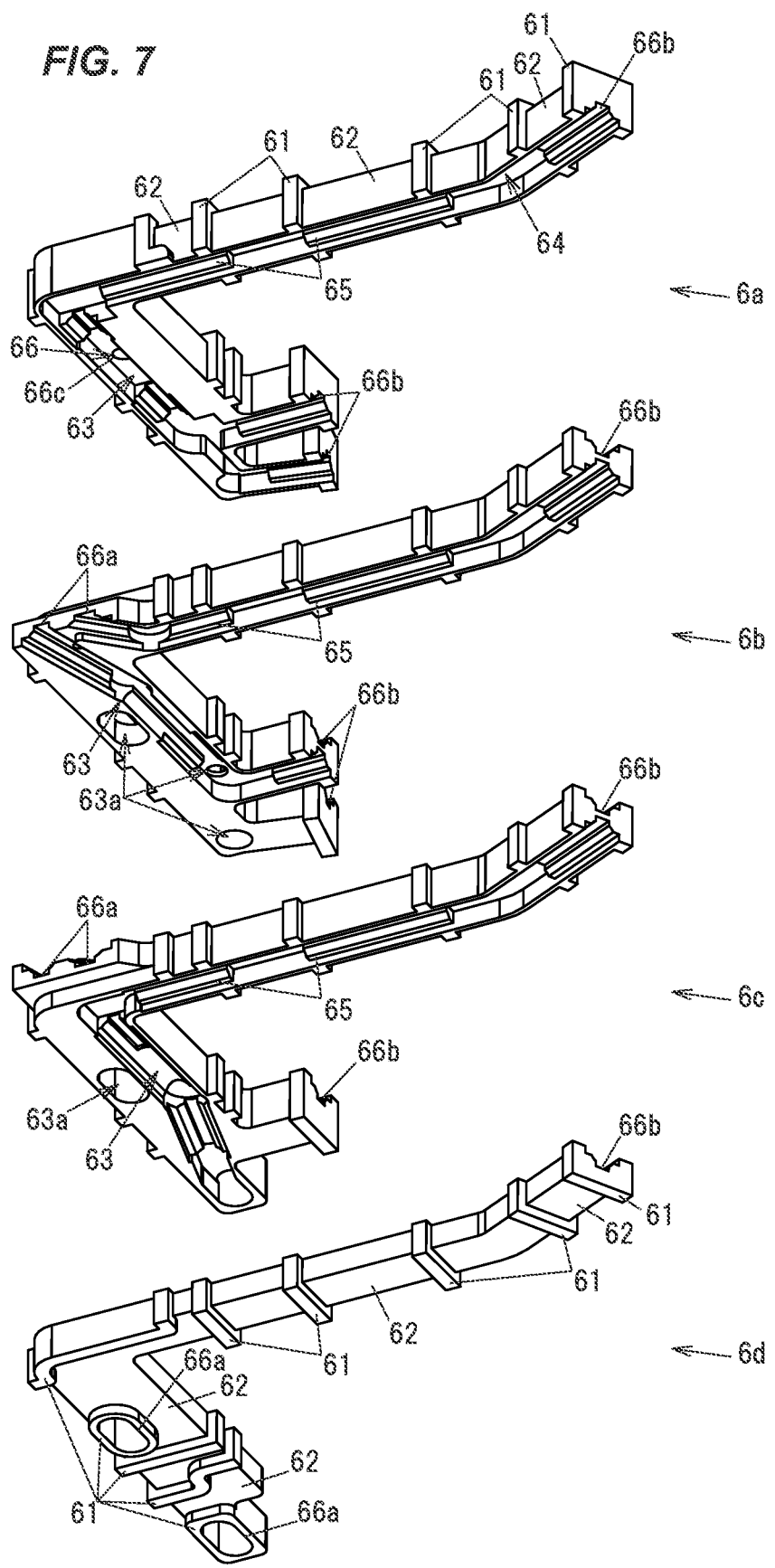
FIG. 7 is an exploded perspective view showing the divided holders of FIG. 6.
Figure 8:
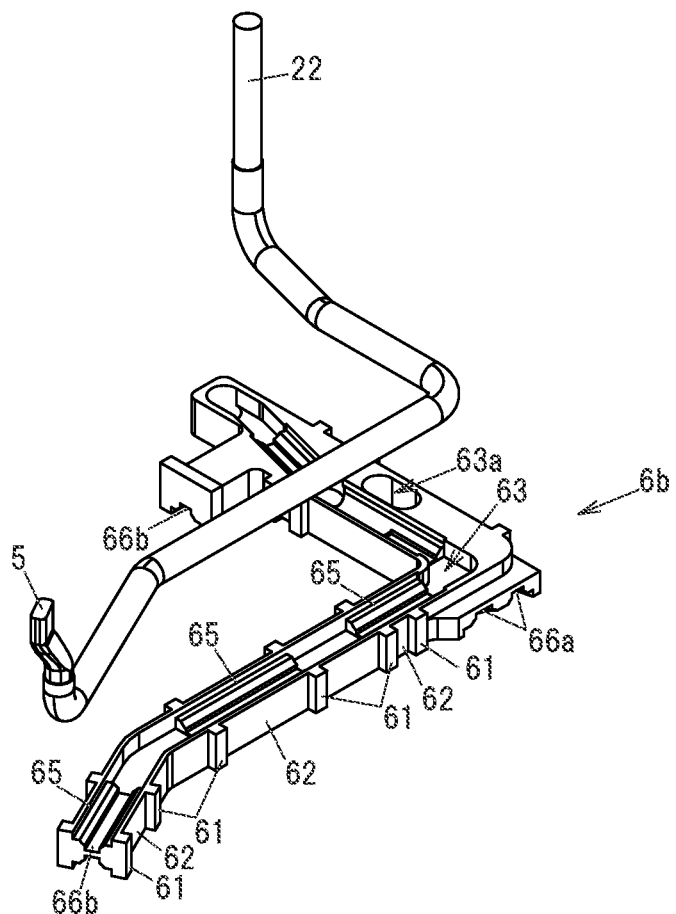
FIG. 8 is a perspective view showing a second U phase lead wire and the second divided holder.

FIG. 3 is a perspective view showing the rotating electric machine wiring member 1 according to the present embodiment whose molded resin sections 7 are omitted therefrom, and FIG. 4 is a cross sectional view taken along a line A-A shown in FIG. 2A. FIG. 5 is an enlarged perspective view of a part of the rotating electric machine wiring member 1. FIGS. 6 and 7 are exploded perspective views showing four divided holders 6a, 6b, 6c, and 6d to together constitute a holder 6 for constituting a holding portion 3 of the rotating electric machine wiring member 1, and FIG. 8 is a perspective view showing the second U phase lead wire 22 and the second divided holder 6b for constituting the holder 6 for constituting the holding portion 3 of the rotating electric machine wiring member 1.

The holding portion 3 of the rotating electric machine wiring member 1 according to the present embodiment is the one configured to integrally hold the plurality of electrical conducting wires 2 together, and is configured to include a holder 6, and a molded resin section 7 comprising a molded resin to cover one part of the holder 6.

The holder 6 is provided to cover all respective peripheries of the plurality of electrical conducting wires 2 in respective one parts in a longitudinal direction of the plurality of electrical conducting wires 2 together, and hold the plurality of electrical conducting wires 2 in a wiring shape. In the present embodiment, the holder 6 constituting the holding portion 3 is configured with a plurality of divided holders 6a, 6b, 6c, and 6d being stacked together in the axial direction of the stator core 111 of the stator 11 (see FIGS. 1A and 1B). Herein, a case will be described in which the holder 6 constituting the holding portion 3 is configured to include the four divided holders 6a, 6b, 6c, and 6d: the first divided holder 6a, the second divided holder 6b, the third divided holder 6c, and the fourth divided holder 6d from the upper side to the lower side (from the side away from the stator core 111 of the stator 11 to the side close to the stator core 111 of the stator 11), but the number of the divided holders 6 is not limited to the above number.

The molded resin section 7 formed to cover one part of the holder 6 in the holding portion 3 is provided to integrally cover a periphery of the stack composed of the plurality of divided holders 6a, 6b, 6c, and 6d. It is desirable that the holder 6 and the molded resin section 7 are made of a material having rigidity in order to hold the plurality of electrical conducting wires 2. Further, in order to melt and integrally configure the holder 6 and the molded resin section 7 with the heat used in molding the molded resin section 7, it is preferable that the holder 6 and the molded resin section 7 are made of the same materials. Specifically, as the holder 6 and the molded resin section 7, for example, those made of a PPS (polyphenylene sulfide) can be used.

In the rotating electric machine wiring member 1 according to the present embodiment, the exposed parts of the holder 6 uncovered (i.e. not covered) with the molded resin section 7, are arranged to surround a peripheral edge of the molded resin section 7. That is, in the present embodiment, the molded resin section 7 is in contact with only the holder 6, but is not in direct contact with the plurality of electrical conducting wires 2.

Hereinafter, the exposed parts of the holder 6 being arranged to surround the peripheral edge of the molded resin section 7 will also be referred to as the mold clamped parts 61 of the holder 6. The mold clamped parts 61 is the parts to be clamped with a mold used to form the molded resin section 7. Since configuring the holder 6 to include the mold clamped parts 61 eliminates the need of clamping the plurality of electrical conducting wires 2 with the mold used to form the molded resin section 7, the mold is prevented from interfering with the plurality of electrical conducting wires 2 and causing damage to the plurality of electrical conducting wires 2. Furthermore, if the plurality of electrical conducting wires 2 are clamped with the mold used to form the molded resin section 7 as in the conventional case, then the plurality of electrical conducting wires 2 cannot be clamped with a strong force in order to suppress the damage to the plurality of electrical conducting wires 2, and are liable to a burr formation caused by the molding resin leaking out from a resulting gap between the mold used to form the molded resin section 7 and the plurality of electrical conducting wires 2, but, according to the present embodiment, as long as the holder 6 is not damaged, it is possible to clamp the mold clamped parts 61 of the holder 6 with the mold with a relatively strong force, and thereby mitigate the concern over the molding resin leaking out from a gap between the mold used to form the molded resin section 7 and the plurality of electrical conducting wires 2.

The mold clamped parts 61 are formed in a flanged shape to surround the peripheral edge of recessed molded resin forming portions 62, which are the portions to be provided with the molded resin sections 7, respectively. In forming the molded resin sections 7, the molded resin sections 7 are formed by clamping the mold clamped parts 61 with the mold, and pouring the molding resin into the molded resin forming portions 62 to cover the molded resin forming portions 62.

In the present embodiment, a plurality of the molded resin sections 7 are formed to be spaced apart from each other. Although the case in which four of the molded resin sections 7 are formed is shown herein, the number of the molded resin sections 7 is not limited to the above number. By forming the plurality of molded resin sections 7 apart from each other, it is possible to integrally configure the plurality of divided holders 6a, 6b, 6c, and 6d with a sufficient strength, reduce the amount of the molding resin to be used in the molded resin sections 7, and ensure a lowering in cost.

In the present embodiment, since the holding portion 3 (the holder 6 constituting the holding portion 3) is provided to cover all the peripheries of the plurality of electrical conducting wires 2, there is a possibility of a lowering in the heat dissipation performance of the plurality of electrical conducting wires 2 in the portion covered by the holding portion 3. In light of the foregoing, in the present embodiment, the holder 6 constituting the holding portion 3 is formed with cooling liquid passageways 63 therein, which are configured to allow passage of a cooling liquid for cooling the plurality of electrical conducting wires 2. For example, when the rotating electric machine 10 is an oil-cooled motor, the rotating electric machine 10 is to be fed with a cooling oil such as an ATF (Automatic Transmission Fluid) or the like as the cooling liquid. By using this cooling oil as the cooling liquid and passing it through the cooling liquid passageways 63 in the holder 6 constituting the holding portion 3, it is possible to perform the cooling of the plurality of electrical conducting wires 2 covered by the holding portion 3.

In the present embodiment, in order to make larger the cooling effect on the plurality of electrical conducting wires 2, the cooling liquid passageways 63 are formed on the respective peripheries of the plurality of electrical conducting wires 2 to allow the cooling liquid to be brought contiguous to the respective outer peripheral surfaces of the plurality of electrical conducting wires 2. More specifically, each of the first, the second, the third, and the fourth divided holders 6a, 6b, 6c, and 6d is formed with a respective electrical conducting wire receiving groove 64 thereon, which is configured to receive a respective one of the plurality of electrical conducting wires 2, with spaces between an inner peripheral surface of the respective electrical conducting wire receiving groove 64 and an outer peripheral surface of the respective one of the plurality of electrical conducting wires 2 being configured to serve as the cooling liquid passageways 63, respectively, to allow the passage of the cooling liquid for cooling the respective one of the plurality of electrical conducting wires 2.

Further, the respective electrical conducting wire receiving groove 64 is provided with respective two electrical conducting wire holding protrusions 65, which are protruded from the inner walls of the respective electrical conducting wire receiving groove 64 into the respective electrical conducting wire receiving groove 64 and brought contiguous to the outer peripheral surface of the respective one of the plurality of electrical conducting wires 2 to hold the respective one of the plurality of electrical conducting wires 2. The tip surfaces of the respective two electrical conducting wire holding protrusions 65 are formed in a curved shape along the outer peripheral surface of the respective one of the plurality of electrical conducting wires 2, and the respective one of the plurality of electrical conducting wires 2 is clamped from the upper side and the lower side with a respective two of the first, the second, the third, and the fourth divided holders 6a, 6b, 6c, and 6d to be stacked together, in such a manner that the respective one of the plurality of electrical conducting wires 2 is clamped with the respective four electrical conducting wire holding protrusions 65 of a respective upper and lower one of the first, the second, the third, and the fourth divided holders 6a, 6b, 6c, and 6d to be stacked together, so that the positional regulation of the respective one of the plurality of electrical conducting wires 2 is performed. Note that the portions of the inner peripheral surface of the respective electrical conducting wire receiving groove 64 being formed with no respective two electrical conducting wire holding protrusions 65 are basically not in contact with the respective one of the plurality of electrical conducting wires 2. It should be noted, however, that because of the influence of a variation in the shape of the respective one of the plurality of electrical conducting wires 2 caused by a manufacturing tolerance or the like, a part of the respective one of the plurality of electrical conducting wires 2 may be in contact with the portions of the inner peripheral surface of the respective electrical conducting wire receiving groove 64 being formed with no respective two electrical conducting wire holding protrusions 65.

Note that, in portions of the first, the second, the third, and the fourth divided holders 6a, 6b, 6c, and 6d in which the plurality of electrical conducting wires 2 are to be bent, the shapes of the plurality of electrical conducting wires 2 are particularly considered not to be stable due to a manufacturing tolerance or the like. For that reason, if the respective two electrical conducting wire holding protrusions 65 are provided in such locations on each of the first, the second, the third, and the fourth divided holders 6a, 6b, 6c, and 6d as to be in correspondence with the portions, respectively, to be bent of the plurality of electrical conducting wires 2, then the plurality of electrical conducting wires 2 may be difficult to receive in the holder 6 constituting the holding portion 3 due to the influences of the variations of the shapes of the plurality of electrical conducting wires 2. In light of the foregoing, in the present embodiment, the respective two electrical conducting wire holding protrusions 65 are configured to hold the straight line shape portions of the plurality of electrical conducting wires 2, but no respective two electrical conducting wire holding protrusions 65 are provided in such locations as to be in correspondence with the portions, respectively, to be bent of the plurality of electrical conducting wires 2.

Further, the respective four electrical conducting wire holding protrusions 65 are provided to be spaced apart from each other in the circumferential direction of the respective one of the plurality of electrical conducting wires 2, and the spaces between adjacent ones of the respective four electrical conducting wire holding protrusions 65 in the circumferential direction of the respective one of the plurality of electrical conducting wires 2 are serving as the cooling liquid passageways 63, respectively, to allow the passage of the cooling liquid for cooling the respective one of the plurality of electrical conducting wires 2. In the present embodiment, the respective four cooling liquid passageways 63 are formed between adjacent ones, respectively, of the respective four electrical conducting wire holding protrusions 65 in the circumferential direction of the respective one of the plurality of electrical conducting wires 2. The respective four cooling liquid passageways 63 are formed in the upper and lower positions and in the left and right positions of the respective one of the plurality of electrical conducting wires 2, and are each being formed in a substantially rectangular shape in a cross-sectional view. It should be noted, however, that the shapes of the respective four cooling liquid passageways 63 are not limited to the above rectangular shape, but may be, for example, a semicircular shape.

Further, the holder 6 is formed with a plurality of cooling liquid inlets and outlets 66 thereon, which are configured to allow the cooling liquid to enter or exit the cooling liquid passageways 63 being formed in the holder 6. In the present embodiment, some of the plurality of cooling liquid inlets and outlets 66 are formed to be open into a periphery of a respective extending out portion of each of the plurality of electrical conducting wires 2 being extended out from the holding portion 3, and are configured to include terminal side cooling liquid inlets and outlets 66a, which are configured to be open into a periphery of each of the plurality of electrical conducting wires 2 being extended out from the holding portion 3 to a terminal 4 side, and coil side cooling liquid inlets and outlets 66b, which are configured to be open into a periphery of each of the plurality of electrical conducting wires 2 being extended out from the holding portion 3 to a coil end 113 side. Further, the cooling liquid inlets and outlets 66 are configured to include a through hole 66c, which is formed to, in the axial direction of the stator core 111 of the stator 11 (see FIGS. 1A and 1B), pass through the first divided holder 6a provided on the uppermost side (the opposite side to the stator core 111 of the stator 11) and which is configured to be open into the upper side. In the present embodiment, the plurality of cooling liquid inlets and outlets 66 are configured to allow the cooling liquid to enter through the through hole 66c formed in the first divided holder 6a, and the cooling liquid to exit through the terminal side cooling liquid inlets and outlets 66a and the coil side cooling liquid inlets and outlets 66b. By configuring the rotating electric machine wiring member 1 to be arranged in such a manner that the through hole 66c formed in the first divided holder 6a is located directly below a feeding port configured to drip the cooling liquid, it is possible to efficiently feed the cooling liquid into the cooling liquid passageways 63 by means of the through hole 66c. In the present embodiment, the through hole 66c is formed to pass through the portion of the first divided holder 6a being covered with the molded resin section 7, that is, the molded resin forming portion 62 and the molded resin section 7 covering the molded resin forming portion 62, but the through hole 66c may be provided in the exposed part of the holder 6 which is not being covered (i.e. uncovered) with the molded resin section 7.

Note that the feeding port for the cooling liquid is not limited to the through hole 66c, but may be configured to allow the cooling liquid to enter through the terminal side cooling liquid inlets and outlets 66a or the coil side cooling liquid inlets and outlets 66b, for example. Further, in the present embodiment, the first and the second U phase lead wires 21 and 22 and the first and the second V phase lead wires 23 and 24 extending toward the two terminals 4 (the U phase terminal 41 and the V phase terminal 42) are extended out to the upper side from the holding portion 3, while the first and the second W phase lead wires 25 and 26 extending toward the one terminal 4 (the W phase terminal 43) are extended out to one side (in a direction perpendicular to the axial direction of the stator core 111 of the stator 11) from the holding portion 3. For that reason, the terminal side cooling liquid inlets and outlets 66a being in association with the first and the second U phase lead wires 21 and 22 and the first and the second V phase lead wires 23 and 24 are provided to be open into the upper side, while the terminal side cooling liquid inlet and outlet 66a being in association with the first and the second W phase lead wires 25 and 26 is provided to be open into the one side. Further, the terminal side cooling liquid inlets and outlets 66a being in association with the first and the second U phase lead wires 21 and 22 and the first and the second V phase lead wires 23 and 24 are each being formed in such a rounded and elongated shape (a rectangular shape having rounded corners) as to receive the respective two electrical conducting wires 2 (the first and the second U phase lead wires 21 and 22 and the first and the second V phase lead wires 23 and 24) together, while the terminal side cooling liquid inlet and outlet 66a being in association with the first and the second W phase lead wires 25 and 26 is formed in such a shape that the end portions of the respective four cooling liquid passageways 63 between adjacent ones of the respective four electrical conducting wire holding protrusions 65 remain exposed as they are, while being provided in the respective upper and lower positions and in the respective left and right positions of each of the two electrical conducting wires 2 (the first and the second W phase lead wires 25 and 26). The coil side cooling liquid inlets and outlets 66b being in association with the six electrical conducting wires 2 (the first and the second U phase lead wires 21 and 22, the first and the second V phase lead wires 23 and 24 and the first and the second W phase lead wires 25 and 26) are formed in such a shape that the end portions of the respective four cooling liquid passageways 63 between adjacent ones of the respective four electrical conducting wire holding protrusions 65 remain exposed as they are, while being provided in the respective upper and lower positions and in the respective left and right positions of each of the six electrical conducting wires 2. Note that the opening directions and shapes of the terminal side cooling liquid inlets and outlets 66a and the coil side cooling liquid inlets and outlets 66b can be appropriately altered according to the wiring shapes of the six electrical conducting wires 2.

In the present embodiment, the holding portion 3 is configured to hold the plurality of electrical conducting wires 2 being aligned in the axial direction of the stator core 111 of the stator 11 (see FIGS. 1A and 1B), and the respective four cooling liquid passageways 63 (the respective electrical conducting wire receiving groove 64) being in association with each of the plurality of electrical conducting wires 2 are also being aligned in the axial direction of the stator core 111 of the stator 11 (see FIGS. 1A and 1B). The upper and lower cooling liquid passageways 63 are in communication with each other by means of communication passageways 63a that are passing through the second and the third divided holders 6b and 6c in the axial direction of the stator core 111 of the stator 11 (see FIGS. 1A and 1B), and which are configured to allow the cooling liquid to be fed into the respective four cooling liquid passageways 63 being in association with each of the plurality of electrical conducting wires 2 by means of the communication passageways 63a passing through the second and the third divided holders 6*b* and 6*c*. Note that the specific structure of the holder 6 is not limited to the above described structure, but can be appropriately altered according to the wiring shapes of the plurality of electrical conducting wires 2 or the like.

(Actions and Advantageous Effects of the Embodiment)

As described above, in the rotating electric machine wiring member 1 according to the present embodiment, the holding portion 3 thereof is configured to include the holder 6, which is provided to cover all the respective peripheries of the plurality of electrical conducting wires 2, and the molded resin section 7 comprising a molded resin to cover one part of the holder 6, wherein the mold clamped parts 61 of the holder 6, which are the exposed parts of the holder 6 not being covered (i.e. uncovered) with the molded resin section 7, are arranged to surround the a peripheral edge of the molded resin section 7.

By configuring the rotating electric machine wiring member 1 in the foregoing manner, it is possible to form the molded resin section 7 by molding a molding resin while clamping the mold clamped parts 61 of the holder 6 with a mold used to form the molded resin section 7, and it is possible to thereby suppress the interference of the mold with the plurality of electrical conducting wires 2 and causing damage to the plurality of electrical conducting wires 2. Further, it is possible to clamp the mold clamped parts 61 of the holder 6, which are a part of the holder 6, with the mold with a relatively strong force, and it is possible to thereby mitigate the concern over the molding resin leaking out from a gap between the mold used to form the molded resin section 7 and the plurality of electrical conducting wires 2. As a result, it is possible to suppress the occurrence of a burr formation resulting from the molding resin leaking out from a gap between the mold used to form the molded resin section 7 and the plurality of electrical conducting wires 2, and it is possible to thereby suppress the occurrence of a foreign object getting into the rotating electric machine 10 resulting from a resulting burr being chipped off.

Summary of the Embodiment

Next, the technical ideas grasped from the above-described embodiments will be described with the aid of the reference characters and the like in the embodiments. It should be noted, however, that each of the reference characters and the like in the following descriptions is not to be construed as limiting the elements in the appended claims to the members and the like specifically shown in the embodiments.

[1] A rotating electric machine wiring member (1), which is configured to connect coil ends (113) of a stator (11) and associated electrodes (132) of a terminal block (13) in a rotating electric machine (10), comprising: a plurality of electrical conducting wires (2); and a holding portion (3) configured to hold the plurality of electrical conducting wires (2) together, the holding portion (3) including a holder (6), which is provided to cover all respective peripheries of the plurality of electrical conducting wires (2) in respective one parts in a longitudinal direction of the plurality of electrical conducting wires (2) together, and a molded resin section (7) comprising a molded resin to cover one part of the holder (6), wherein exposed parts (61) of the holder (6) uncovered with the molded resin section (7) are arranged to surround a peripheral edge of the molded resin section (7).

[2] The rotating electric machine wiring member (1) as defined in the above [1], wherein the holder (6) includes cooling liquid passageways (63) configured to allow passage of a cooling liquid for cooling the plurality of electrical conducting wires (2).

[3] The rotating electric machine wiring member (1) as defined in the above [2], wherein the cooling liquid passageways (63) are provided on the respective peripheries of the plurality of electrical conducting wires (2) to allow the cooling liquid to be brought contiguous to respective outer peripheral surfaces of the plurality of electrical conducting wires (2).

[4] The rotating electric machine wiring member (1) as defined in the above [2] or [3], wherein the holder (6) further includes a plurality of cooling liquid inlets and outlets configured to allow the cooling liquid to enter or exit the cooling liquid passageways (63).

[5] The rotating electric machine wiring member (1) as defined in any one of the above [1] to [4], wherein the holding portion (3) is configured to include a plurality of the molded resin sections (7), which are spaced apart from each other.

[6] The rotating electric machine wiring member (1) as defined in any one of the above [1] to [5], wherein the holder (6) includes a plurality of divided holders (6*a*, 6*b*, 6*c*, and 6*d*) being stacked together, wherein the molded resin section (7) is configured to integrally cover a periphery of the plurality of divided holders (6*a*, 6*b*, 6*c*, and 6*d*).

Although the embodiments of the present invention have been described above, the above described embodiments are not to be construed as limiting the inventions according to the appended claims. Further, it should be noted that not all the combinations of the features described in the embodiments are indispensable to the means for solving the problem of the invention.

The present invention can be appropriately modified and implemented without departing from the spirit thereof. For example, although having not been mentioned in the above embodiment, the rotating electric machine wiring member 1 may be configured in such a manner that the first, the second, the third, and the fourth divided holders 6*a*, 6*b*, 6*c*, and 6*d* to together constitute the holder 6 for constituting the holding portion 3 are provided with protrusions, holes, and the like thereon, which are configured to allow the positional alignment of the first, the second, the third, and the fourth divided holders 6*a*, 6*b*, 6*c*, and 6*d* to be performed when the first, the second, the third, and the fourth divided holders 6*a*, 6*b*, 6*c*, and 6*d* are stacked together.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A rotating electric machine wiring member, which is configured to connect coil ends of a stator and associated electrodes of a terminal block in a rotating electric machine, comprising:
   a plurality of electrical conducting wires; and
   a holding portion configured to hold the plurality of electrical conducting wires together, the holding portion including a holder, which is provided to cover all respective peripheries of the plurality of electrical conducting wires in respective one parts in a longitudinal direction of the plurality of electrical conducting wires together, and a molded resin section comprising a molded resin to cover one part of the holder, wherein exposed parts of the holder uncovered with the molded resin section are arranged to surround a peripheral edge of the molded resin section, and wherein the holder includes cooling liquid passageways configured to allow passage of a cooling liquid for cooling the plurality of electrical conducting wires.

2. The rotating electric machine wiring member according to claim 1, wherein the cooling liquid passageways are provided on the respective peripheries of the plurality of electrical conducting wires to allow the cooling liquid to be brought contiguous to respective outer peripheral surfaces of the plurality of electrical conducting wires.

3. The rotating electric machine wiring member according to claim 1, wherein the holder further includes a plurality of cooling liquid inlets and outlets configured to allow the cooling liquid to enter or exit the cooling liquid passageways.

4. The rotating electric machine wiring member according to claim 1, wherein the holding portion is configured to include a plurality of the molded resin sections, which are spaced apart from each other.

5. The rotating electric machine wiring member according to claim 1, wherein the holder includes a plurality of divided holders being stacked together, wherein the molded resin section is configured to integrally cover a periphery of the plurality of divided holders.

* * * * *